United States Patent
Thundat et al.

(12) 
(10) Patent No.: US 6,336,366 B1
(45) Date of Patent: Jan. 8, 2002

(54) PIEZOELECTRICALLY TUNABLE RESONANCE FREQUENCY BEAM UTILIZING A STRESS-SENSITIVE FILM

(75) Inventors: Thomas G. Thundat, Knoxville; Eric A. Wachter, Oak Ridge, both of TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/405,924

(22) Filed: Sep. 24, 1999

(51) Int. Cl.[7] .......................... G01P 15/09; H01L 41/00
(52) U.S. Cl. ............... 73/514.34; 73/514.36; 310/331
(58) Field of Search ................ 73/514.34, 514.16, 73/514.33, 514.35, 514.36; 310/329, 330, 331

(56) References Cited

U.S. PATENT DOCUMENTS

| | | | |
|---|---|---|---|
| 4,479,385 A | * 10/1984 | Koehler | 73/514.29 |
| 5,425,750 A | * 6/1995 | Moberg | 607/19 |
| 5,719,324 A | 2/1998 | Thundat | |
| 5,833,713 A | * 11/1998 | Moberg | 607/19 |
| 5,918,263 A | 6/1999 | Thundat | |
| 5,973,441 A | * 10/1999 | Lo et al. | 310/330 |
| 6,098,460 A | * 8/2000 | Otsuchi et al. | 73/514.34 |

OTHER PUBLICATIONS

G. Y. Chen, et al "Adsorption–Induced Surface Stress & Its Effects on Resonance Frequency of Microcaltilevers" J.Appl.Phys. 77 (8), Apr. 1995, 1–5.

M. Ilavsky et al, Responsive Gels: Volume Transitions I Editor: K. Dusek, 1993.

* cited by examiner

Primary Examiner—Richard A. Moller
(74) Attorney, Agent, or Firm—Joseph A. Marasco; J. Kenneth Davis

(57) ABSTRACT

Methods and apparatus for detecting particular frequencies of acoustic vibration utilize a piezoelectrically-tunable beam element having a piezoelectric layer and a stress sensitive layer and means for providing an electrical potential across the piezoelectric layer to controllably change the beam's stiffness and thereby change its resonance frequency. It is then determined from the response of the piezoelectrically-tunable beam element to the acoustical vibration to which the beam element is exposed whether or not a particular frequency or frequencies of acoustic vibration are detected.

21 Claims, 4 Drawing Sheets

PIEZOELECTRICALLY TUNABLE RESONANCE FREQUENCY BEAM UTILIZING A STRESS-SENSITIVE FILM

CROSS-REFERENCE TO RELATED APPLICATIONS

The invention herein described and claimed relates to U.S. patent application Ser. No. 09/405,461, entitled *Magnetically Tunable Resonance Frequency Beam Utilizing A Stress-Sensitive Film* by J. K. Davis et al., filed on even date herewith, the entire disclosure of which is incorporated herein by reference.

The invention herein described and claimed relates to U.S. patent application Ser. No. 09/404,954, entitled *Electrostatically Tunable Resonance Frequency Beam Utilizing A Stress-Sensitive Film* by T. G. Thundat et al., filed on even date herewith, the entire disclosure of which is incorporated herein by reference.

The United States Government has rights in this invention pursuant to contract no. DE-AC05-96OR22464 between the United States Department of Energy and Lockheed Martin Energy Research Corporation.

FIELD OF THE INVENTION

The present invention relates to methods and apparatus for detecting particular frequencies of vibration, and especially for detecting and selecting particular frequencies of vibration using detection and selection apparatus comprising piezoelectrically-tunable beam members such as cantilevers and very small cantilevers, often called microcantilevers.

BACKGROUND OF THE INVENTION

The resonance frequencies of a beam occur at discrete values based on the geometrical and mechanical properties of the beam and the environment in which it is located. The efficiency of resonance is measured by the quality factor (or Q-factor), where large Q-factors correspond to high efficiency. High-Q beams such as cantilever beams can be used as efficient listening devices for particular frequencies, with much higher sensitivity and specificity for particular acoustic bands of interest in comparison to conventional acoustic transducers. Moreover, microcantilevers, which are only a few hundred microns in length, are also much more simple to produce and could be far smaller in comparison to standard microphone technologies. Unfortunately, as an inevitable consequence of their high specificity, one would need an exorbitant number of fixed-frequency cantilevers to cover a broad frequency spectrum. Because of this simple reason cantilever-based listening devices have not attracted significant attention. Thus, it is desirable to make a high-Q cantilever that uses a piezoelectric method to achieve broad frequency tunability. The resonance frequency of such a cantilever can be changed by varying a voltage applied to a piezoelectric layer and thereby varying a stress within a stress-sensitive material which may comprise an element of the cantilever.

OBJECTS OF THE INVENTION

Accordingly, it is an object of the present invention to provide a new and improved method and apparatus for tuning the resonant frequency of a beam such as a cantilever element, and more specifically to provide a new method and apparatus for tuning the resonant frequency of a beam such as a cantilever element by varying a voltage applied to a piezoelectric material which comprises the beam or an element thereof. Further and other objects of the present invention will become apparent from the description contained herein.

SUMMARY OF THE INVENTION

In accordance with one aspect of the present invention, the foregoing and other objects are achieved by a piezoelectrically-tunable beam for detecting a particular frequency of vibration which comprises: a beam element having an end and a surface, and being fixedly disposed on the end; a stress-sensitive means for controlling stiffness of the beam selected from the group consisting of: a stress sensitive coating having a stiffness that varies with the stress therein affixed on the surface of the beam element and the beam element material having a stiffness that varies with the stress therein; a piezoelectric means for varying stiffness selected from the group consisting of a piezoelectric coating having stiffness that varies with a voltage applied thereacross affixed on the surface of the beam element and the beam element material having stiffness that varies with an electrical potential applied thereacross; and an electrical potential means suitably disposed and connected for providing an electrical potential across the piezoelectric means so that the electrical potential causes bond lengths between constituent molecules within the piezoelectric means to vary, and thus produces a change in stress in the stress sensitive means and a change in the resonance frequency of the piezoelectrically-tunable beam.

In accordance with a second aspect of the present invention, the foregoing and other objects are achieved by a method for detecting a particular frequency of acoustical vibration in an environment, the method comprising the steps of: providing a piezoelectrically-tunable beam comprising a beam element having an end and a surface and being fixedly disposed on the end; a stress-sensitive means for controlling stiffness of the beam selected from the group consisting of: a stress sensitive coating having a stiffness that varies with the stress therein affixed on the surface of the beam element and the beam element material having a stiffness that varies with the stress therein; a piezoelectric means for varying stiffness selected from the group consisting of: a piezoelectric coating having stiffness that varies with an electrical potential applied thereacross affixed on the surface of the beam element and the beam element material having stiffness that varies with an electrical potential applied thereacross; and electrical potential means suitably disposed and connected for providing an electrical potential across the piezoelectric means; exposing the beam element to the environment; activating the electrical potential means to cause an electrical potential across the piezoelectric means to cause bond lengths between constituent molecules in the piezoelectric means to vary thereby producing a change in stress in the stress sensitive means and a change in the resonance frequency of the piezoelectrically-tunable beam to establish the resonance frequency of the piezoelectrically-tunable beam at the desired frequency; and determining from the resonance response of the piezoelectrically-tunable beam whether the particular frequency of vibration is detected. In accordance with a third aspect of the present invention, the foregoing and other objects are achieved by a method for selecting a desired frequency of acoustical vibration from a mixture of frequencies which comprises the steps of: providing a piezoelectrically-tunable beam comprising a beam element having an end and a surface and being fixedly disposed on the end; a stress-sensitive means for controlling stiffness of the beam selected from the group consisting of: a stress sensitive coating having a stiffness that varies with the stress therein affixed on the surface of the beam element and the beam element material having a stiffness that varies with the stress therein; a piezoelectric means for varying stiffness selected from the group consisting of: a piezoelectric coating having stiffness that varies with an electrical potential applied thereacross affixed on the surface of the beam element and the beam element material having stiffness that varies with an electrical potential applied thereacross; and electrical potential means suitably disposed and connected for providing an electrical potential across the piezoelectric means; activating the electrical potential means to cause an electrical potential across the piezoelectric means to cause bond lengths between constituent molecules in the piezoelectric means to vary thereby producing a change in stress in the stress sensitive means and a change in the resonance frequency of the piezoelectrically-tunable beam to establish the resonance frequency of the piezoelectrically-tunable beam at the desired frequency; exposing the piezoelectrically-tunable beam to the mixture of frequencies; and determining from the resonance response of the piezoelectrically-tunable beam whether the particular frequency of vibration is detected.

Figure 1A:
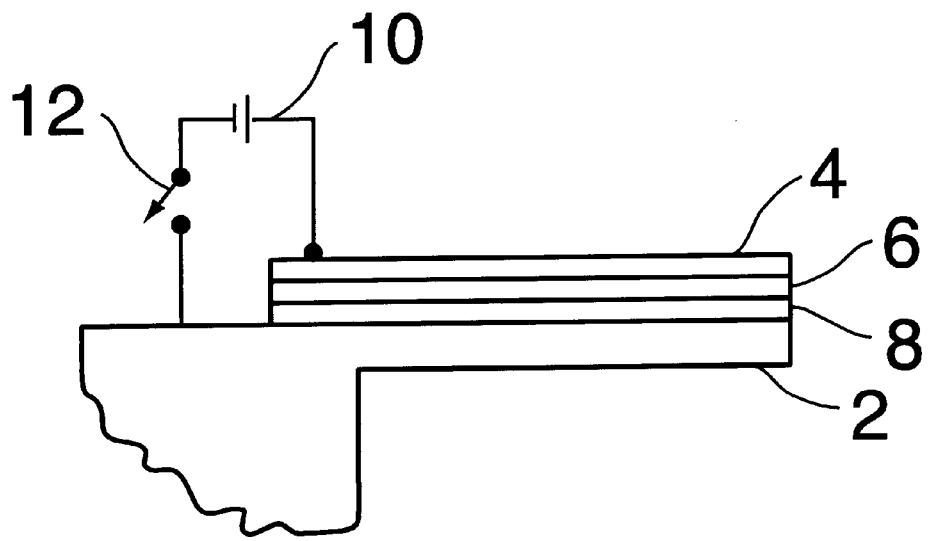
FIGS. 1a and 1b show a preferred method for varying cantilever resonance frequency wherein a piezoelectric layer and conductive layers are applied to the cantilever.

For a better understanding of the present invention, together with other and further objects, advantages and capabilities thereof, reference is made to the following disclosure and appended claims in connection with the above-described drawings.

DETAILED DESCRIPTION OF THE INVENTION

The claimed invention is based on the concept of changing the resonance frequency of a cantilever by changing its stiffness. The resonance frequency, $v$, of an oscillating cantilever can be expressed as $$v = \frac{1}{2\pi}\sqrt{\frac{K}{m^*}} \qquad (1)$$

where K is the stiffness and $m^*$ is the effective mass of the cantilever. Note that $m^* = nm_b$, where $m_b$ is the mass of the cantilever beam and the value of n is about 0.24 for a rectangular cantilever. There are several approaches by which the resonance frequency of a cantilever can be varied. The approach described herein involves the application of a piezoelectric layer and conductive layers to the cantilever surface. The piezoelectric layer is disposed between two conductive layers. Young's Modulus for the piezoelectric layer varies with applied stress due to changes in bond length of the constituent molecules. The bond length of the constituent molecules within the piezoelectric material is changed when an electrical potential is applied across the piezoelectric layer. Piezoelectric materials are well known, and may be selected from, but not limited to metals, metal alloys, dielectric materials, polymeric materials and combinations thereof.

When the length of the cantilever is much larger than the width, Hooke's Law for small deflections relating the curvature with effective modulus, Y, and moment, M, is given by $$\frac{d^2z}{dy^2} = \frac{M}{YI} \qquad (2)$$

where $d^2z/dy^2$ represents I, y represents distance, and z represents deflection.

The effective modulus Y in isotropic elasticity is $E/(1-v)$ where E is Young's Modulus and $v$ is Poisson's ratio for the substrate. For rectangular cantilevers, the area moment of inertia I is given by $Wt^3/12$, where W is the width and t is the thickness. The moment due to stress $\delta s$ is given as $\delta s$ $Wt/2$. Using the moment equation 2 can be written in the form of Stoney's formula as $$\frac{1}{R} = \frac{6(1-v)\delta s}{Et^2} \qquad (3)$$

where the reciprocal of the radius of curvature, R, equals $d^2z/dy^2$. The displacement and surface stress are related by Equation 2. Taking into account the boundary conditions of a cantilever, Equation 2 can be solved and the displacement of the cantilever, z, can be written as $$z = \left[\frac{3(1-v)L^2}{t^2E}\right]\delta s \qquad (4)$$

where L is the length of the cantilever.

Differential surface stress, $\delta s$, induced in the cantilever or in a piezoelectric coating located on the surface of the cantilever changes the effective rigidity of the cantilever, resulting in a shift in stiffness from K to ($K+\delta K$). Therefore Equation 1 can be rewritten as $$v_2 = \frac{1}{2\pi}\sqrt{\frac{K+\delta K}{m^*}} \qquad (5)$$

where the initial resonance frequency $v_1$ changes to $v_2$ due to surface stress. By using piezoelectric materials in or on the cantilever, large values of $\delta K$ can be obtained for small changes in surface stress.

Figure 1B:
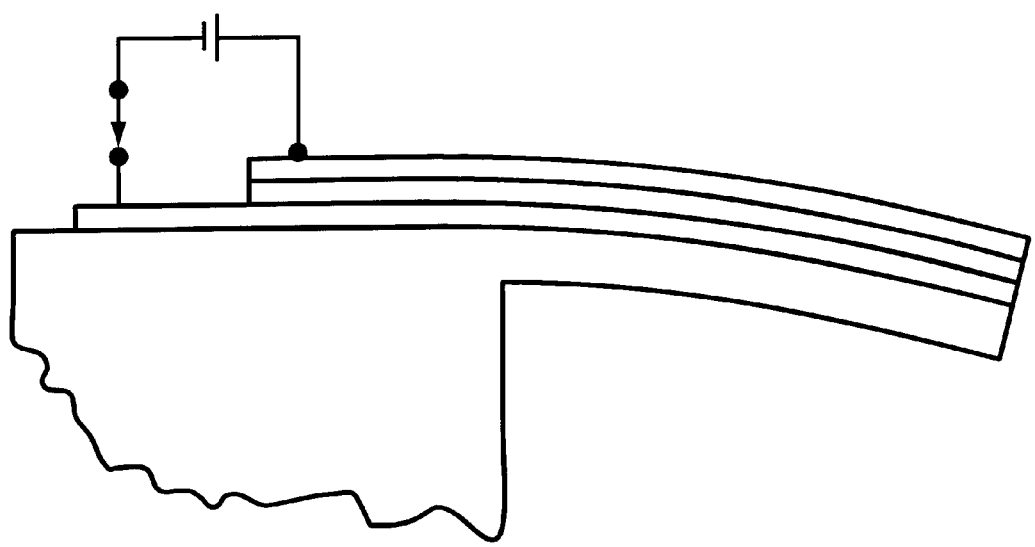

A preferred method for varying cantilever resonance frequency is shown in FIGS. 1a and 1b, which represent side views of a piezoelectrically-tunable cantilever. In FIG. 1a, a cantilever 2 has conductive layers 4 and 8 and a piezoelectric layer 6 applied between the conductive layers. The conductive layers 4 and 8 are separated from each other by the piezoelectric layer 6, and are electrically insulated from each other. The cantilever 2 may consist of any of a number of dielectric materials, such as silicon nitride or silicon dioxide, while the conductive layers 4 and 8 may preferably be composed of metals such as gold or platinum or some other conductive material. An electrical potential is applied across the conductive layers 4 and 8 by connection to an electrical potential source 10. This potential source 10 may be a static potential that is controlled by a switch 12, or it may be a time-varying pattern such as a sinusoid or a triangular waveform. When the potential is applied (FIG. 1b), piezoelectric action in the piezoelectric layer 6 causes the dimension of the piezoelectric material to change thereby changing the spring constant of the cantilever. This results in a change in stiffness and concomitant change in resonance frequency. The magnitude of the change in resonance frequency is controlled by the extent of the change in dimension of the piezoelectric material, which is in turn controlled by the magnitude of the applied electrical potential.

Figure 2A:
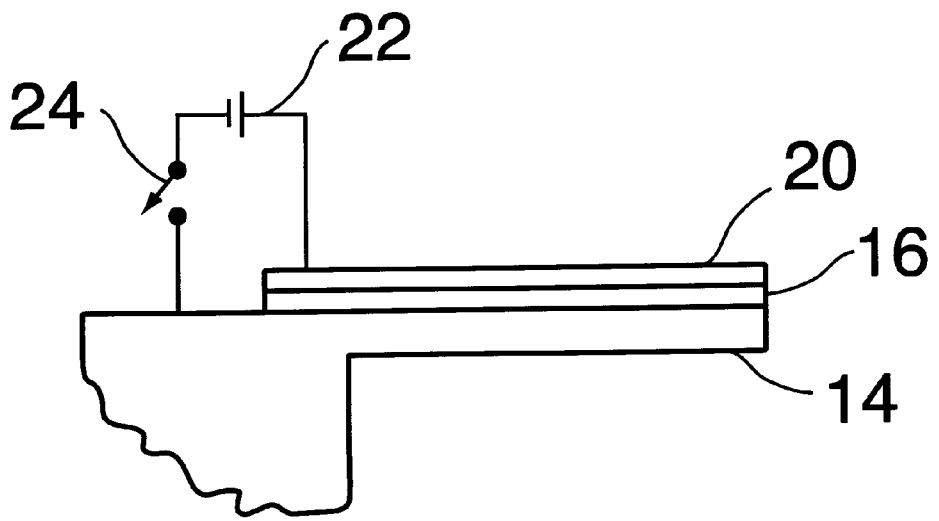
FIGS. 2a and 2b show an alternate design for a cantilever assembly wherein the cantilever itself comprises an electrical conductor.
Figure 2B:
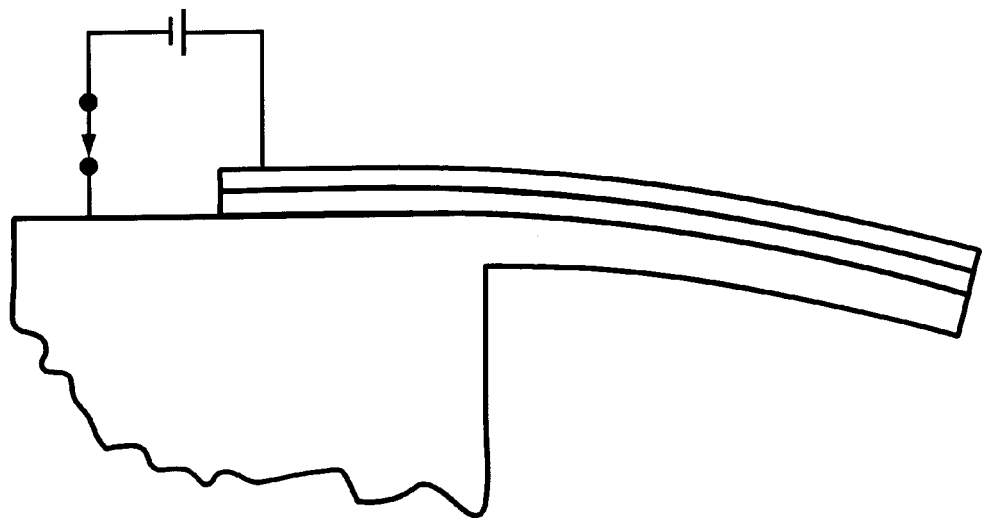

An alternative design for the cantilever assembly is shown in FIGS. 2a and 2b. Here, the cantilever itself 14 is composed of a conductive material, with piezoelectric layer 16 applied to one side. The piezoelectric layer 16 separates the conductive cantilever 14 from a second conductor 20. A potential source 22 is applied between the two conductors 14 and 20. A switch 24 may be used to control the application of the electrical potential, or a time-varying source may be used, as in the previous example.

Figure 3A:
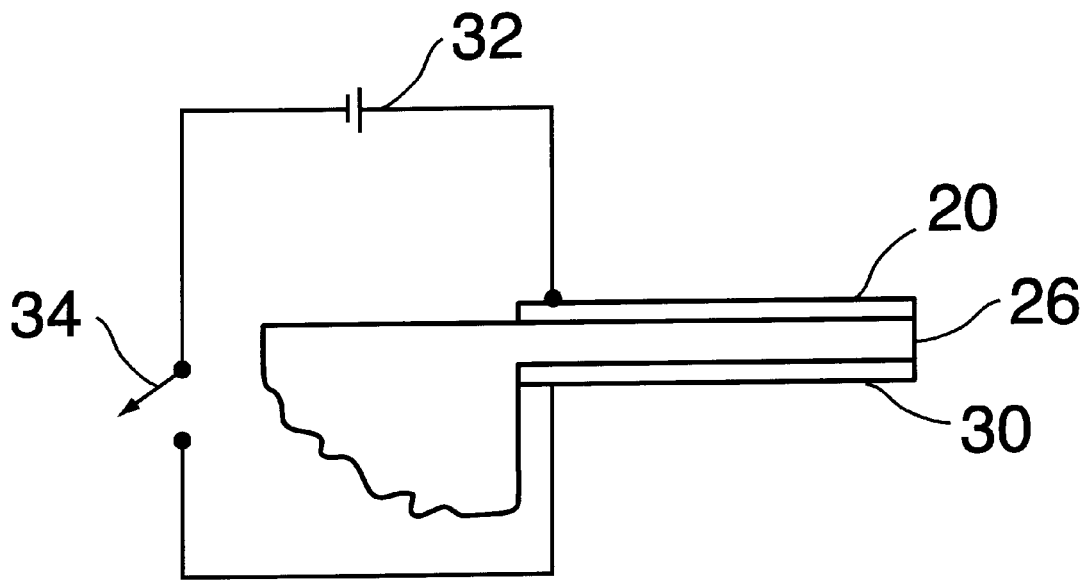
FIGS. 3a and 3b show another alternate design for a cantilever assembly wherein the cantilever itself comprises a piezoelectric material.
Figure 3B:
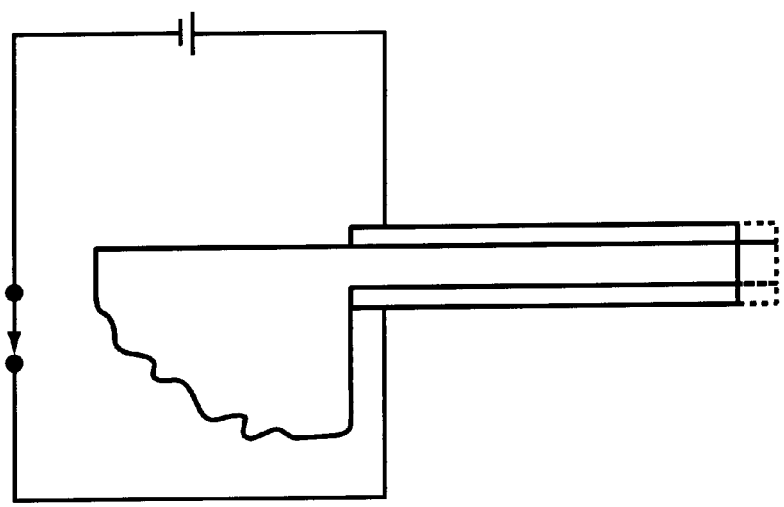

Another alternative design shown in FIGS. 3a and 3b uses a cantilever beam composed of a material exhibits piezoelectric properties. A piezoelectric cantilever 26 is separated by a first conductor 28 a second conductor 30. Imposition of a potential difference between the conductors 28 and 30 by application of an external potential source 32 causes the dimension of the piezoelectric material to change, thereby changing the spring constant of the cantilever. This results in a change in stress, stiffness, and hence resonance frequency. A switch 34 or time-varying potential source may be used to control the resonance frequency of the cantilever as a function of time.

Figure 4:
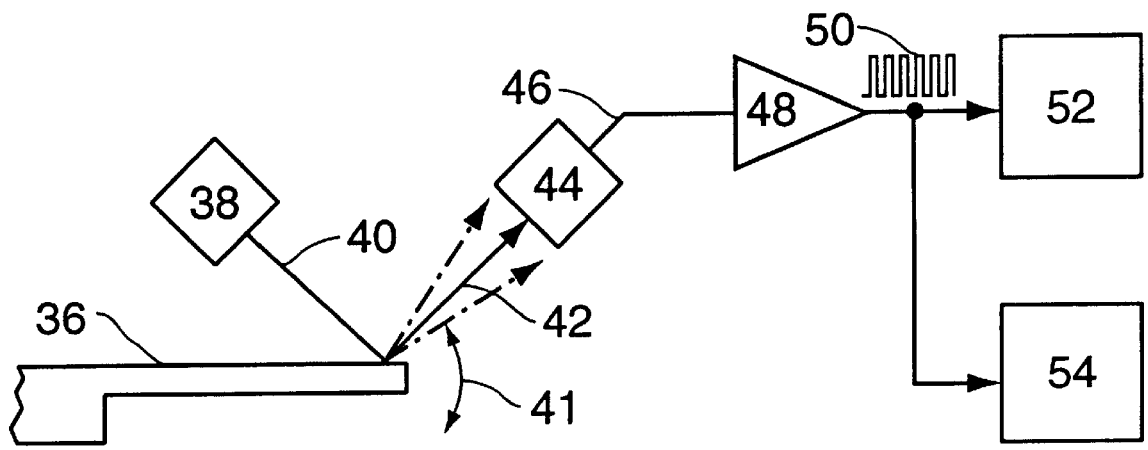
FIG. 4 shows an example of an optical detection method.

The tuning range available to an individual cantilever as shown in FIGS. 1, 2, or 3 will depend on the initial stiffness of the cantilever beam, the extent of bending exerted on the beam, and the change in stress for piezoelectric material. To effect high sensitivity detection of acoustic energy, the cantilever is electronically tuned to the appropriate resonance frequency, where it will respond by vibrating in resonance with the acoustic signal. This vibration can be detected by any of several common means, including optical detection of cantilever deflection, changes in piezoelectricity of coatings applied to the cantilever, capacitance variation between the cantilever and a fixed surface, piezoresistance of cantilever beam, or changes in tunneling current or capacitance between the cantilever and a stationary electrode. These methods are all well-known to the artisan skilled in atomic force microscopy for sensitive detection of cantilever deflection. An example of the optical deflection means is shown in FIG. 4. Here, vibration of a cantilever 36 is monitored using a diode laser 38. Light 40 emitted from the laser 38 is reflected from the end of the cantilever 36. The reflected light 42 sweeps across a position sensitive photodiode 44 at the frequency of cantilever vibration, indicated by arrow 41. Output from the photodiode 46 is amplified by an amplifier 48 and the output signal 50 is fed into a counting circuit 52. The number of cycles per unit time observed by the counter is used to determine the frequency of vibration. The amplitude of the output signal 50 is monitored by an analog differentiation circuit 54 to determine the magnitude of the cantilever oscillation.

Figure 5:
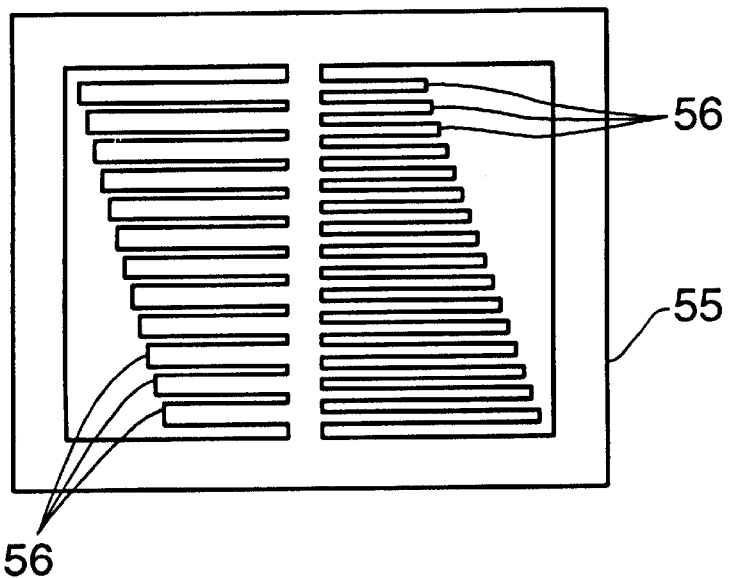
FIG. 5 shows a possible arrangement of multiple cantilevers having different geometries which can be used as an ensemble to cover an acoustic spectrum.

To detect a broad range of frequencies, it may be desirable to use an array of cantilevers 55, each element of which is individually tuned for optimal response over a portion of the total acoustic range. A possible configuration is shown in FIG. 5, where cantilevers having different geometries 56 are used as an ensemble to cover an acoustic spectrum. Each element may be tuned during manufacture to assure the preferred response within its functional range. A possible packaging configuration for an array of cantilevers might include all readout electronics on a single monolithic device. Such a device could be manufactured using standard integrated circuit production methods, and would require the use of no additional discrete components. As such, it could be considerably smaller, less expensive, and more rugged than other available acoustic monitoring technologies.

The claimed invention provides a number of advantages and features: Tunability—The method provides a means for achieving high sensitivity and high selectivity through the use of tunable, high-Q resonance frequency. Simplicity—Resonance frequency is inherently simple to measure, and the small devices can be manufactured in arrays having desired acoustic response characteristics. Speed—Much faster response time (tens of $\mu s$) than conventional acoustic detectors (tens of ms) due to extremely small size and large Q value. Sensitivity—The sensitivity can be controlled by the geometry of the cantilevers and the coating on the cantilevers. This can be made very broadband, narrow band, low pass, or high pass. Size—Current state-of-the-art in micro-manufacturing technologies suggest that a sensor array and control electronics could be housed in a standard transistor package. Low power consumption—The power requirement are estimated to be in sub-mW range for individual sensors allowing the use of battery or photovoltaic power. Low cost—No exotic or expensive materials or components are needed for sensor fabrication. Electronics for operation and control are of conventional design, and are relatively simple and inexpensive. Wide range—A wide range of the acoustic spectrum could be detected using an array of cantilevers with different initial K values.

A number of alternative embodiments are possible. The device herein before described is made of cantilever-type beams with one end free to vibrate. However, a similar device may be constructed using beams of other configurations, such as simply supported beams wherein both ends are supported, free to rotate; or beams with both ends fixed, not free to rotate; with one end fixed and one end supported and free to rotate; and other simple and compound beam structures and combinations, such as triangular beams having two corners fixed and the third corner free.

Alternative uses are also possible. For example, in addition to being used to detect particular frequencies of acoustic vibration, the apparatus may be used as a narrow band filter to select a particular frequency out of a mixture of acoustic frequencies.

Applications for the claimed invention are numerous and varied, and may include: passive listening devices for detection of concealed objects, including submarines and buried structures, location of fish schools, or detection of leaking pipelines; passive flow monitoring based on acoustic signatures of the Venturi Effect and other phenomenon; replacing microphones used to detect pending mechanical failure of machine components (for example, the gear box of helicopters, machine tools, power plant turbines, or automobile engines); detection of thermal or mechanical stress in objects or structures based on passive acoustic signatures; burglar and intrusion detectors and alarms for buildings and vehicles; simplified voice recognition systems; and cochlear implants for hearing impaired people.

While there has been shown and described what are at present considered the preferred embodiments of the invention, it will be obvious to those skilled in the art that various changes and modifications can be made therein without departing from the scope of the inventions defined by the appended claims.

We claim:

1. A piezoelectrically-tunable beam for detecting a particular frequency of vibration comprising:
   (A) a beam element having an end and a surface, and being fixedly disposed on the end;
   (B) a stress-sensitive means for controlling stiffness of the beam selected from the group consisting of: a stress sensitive coating having a stiffness that varies with the stress therein affixed on the surface of the beam element and the beam element material having a stiffness that varies with the stress therein;
   (C) a piezoelectric means for varying stiffness selected from the group consisting of: a piezoelectric coating having stiffness that varies with a voltage applied thereacross affixed on the surface of the beam element and the beam element material having stiffness that varies with an electrical potential applied thereacross; and
   (D) an electrical potential means suitably disposed and connected for providing an electrical potential across the piezoelectric means so that the electrical potential causes bond lengths between constituent molecules within the piezoelectric means to vary, and thus produces a change in stress in the stress sensitive means and a change in the resonance frequency of the piezoelectrically-tunable beam.

2. The piezoelectrically-tunable beam as described in claim 1 wherein the beam element comprises a cantilever beam.

3. The piezoelectrically-tunable beam as described in claim 1 wherein the stress-sensitive means is selected from the group consisting of: metals, metal alloys, dielectric materials, polymeric materials and combinations thereof.

4. The piezoelectrically-tunable beam as described in claim 1 wherein the piezoelectrically-tunable cantilever beam material is selected from the group consisting of metals, metal alloys, dielectric materials, polymeric materials and combinations thereof.

5. The piezoelectrically-tunable beam as described in claim 1 wherein the piezoelectric means comprises a coating which is disposed as a layer between a first conductive coating and a second conductive coating, the conductive coatings being selected from the group consisting of conductive metals and conductive alloys of metals, and the first conductive coating and second conductive coating being operably disposed so that the electrical potential means provides the electrical potential across the piezoelectric means therethrough.

6. The piezoelectrically-tunable beam as described in claim 1 further comprising detection means for detecting vibration of the beam element.

7. The piezoelectrically-tunable beam as described in claim 6 wherein the detection means is selected from the group consisting of optical detection means, means utilizing changes in piezoresistance of the piezoelectric means and means utilizing changes in tunneling current between the piezoelectrically-tunable beam and a stationary electrode.

8. A method for detecting a particular frequency of acoustical vibration in an environment, the method comprising the steps of:
   (A) providing a piezoelectrically-tunable beam comprising a beam element having an end and a surface and being fixedly disposed on the end; a stress-sensitive means for controlling stiffness of the beam selected from the group consisting of: a stress sensitive coating having a stiffness that varies with the stress therein affixed on the surface of the beam element and the beam element material having a stiffness that varies with the stress therein; a piezoelectric means for varying stiffness selected from the group consisting of: a piezoelectric coating having stiffness that varies with an electrical potential applied thereacross affixed on the surface of the beam element and the beam element material having stiffness that varies with an electrical potential applied thereacross; and electrical potential means suitably disposed and connected for providing an electrical potential across the piezoelectric means;
   (B) exposing the beam element to the environment;
   (C) activating the electrical potential means to cause an electrical potential across the piezoelectric means to cause bond lengths between constituent molecules in the piezoelectric means to vary thereby producing a change in stress in the stress sensitive means and a change in the resonance frequency of the piezoelectrically-tunable beam to establish the resonance frequency of the piezoelectrically-tunable beam at the desired frequency; and
   (D) determining from the resonance response of the piezoelectrically-tunable beam whether the particular frequency of vibration is detected.

9. The method as described in claim 8 wherein the beam element comprises a cantilever beam.

10. The method as described in claim 8 wherein the stress-sensitive means is selected from the group consisting of of metals, metal alloys, dielectric materials, polymeric materials and combinations thereof.

11. The method as described in claim 8 wherein the piezoelectrically-tunable cantilever beam material is selected from the group consisting of metals, metal alloys, dielectric materials, polymeric materials and combinations thereof.

12. The method as described in claim 8 wherein the piezoelectric means comprises a coating which is disposed as a layer between a first conductive coating and a second conductive coating, the conductive coatings being selected from the group consisting of conductive metals and conductive alloys of metals, and the first conductive coating and the second conductive coating being operably disposed so that the electrical potential means provides the electrical potential across the piezoelectric means therethrough.

13. The method as described in claim 8 further comprising the step of utilizing means for detecting vibration of the beam element.

14. The method as described in claim 13 wherein the detection means is selected from the group consisting of optical detection means, means utilizing changes in piezoresistance of the piezoelectric means and means utilizing changes in tunneling current between the piezoelectrically-tunable beam and a stationary electrode.

15. A method for selecting a desired frequency of acoustical vibration from a mixture of frequencies comprising the steps of:
   (A) providing a piezoelectrically-tunable beam comprising a beam element having an end and a surface and being fixedly disposed on the end; a stress-sensitive means for controlling stiffness of the beam selected from the group consisting of: a stress sensitive coating having a stiffness that varies with the stress therein affixed on the surface of the beam element and the beam element material having a stiffness that varies with the stress therein; a piezoelectric means for varying stiffness selected from the group consisting of a piezoelectric coating having stiffness that varies with an electrical potential applied thereacross affixed on the surface of the beam element and the beam element material having stiffness that varies with an electrical potential applied thereacross; and electrical potential means suitably disposed and connected for providing an electrical potential across the piezoelectric means;

(B) activating the electrical potential means to cause an electrical potential across the piezoelectric means to cause bond lengths between constituent molecules in the piezoelectric means to vary thereby producing a change in stress in the stress sensitive means and a change in the resonance frequency of the piezoelectrically-tunable beam to establish the resonance frequency of the piezoelectrically-tunable beam at the desired frequency;

(C) exposing the piezoelectrically-tunable beam to the mixture of frequencies; and (D) determining from the resonance response of the piezoelectrically-tunable beam whether the particular frequency of vibration is detected.

16. The method as described in claim 15 wherein the beam element comprises a cantilever beam.

17. The method as described in claim 15 wherein the stress-sensitive means is selected from the group consisting of of metals, metal alloys, dielectric materials, polymeric materials and combinations thereof.

18. The method as described in claim 15 wherein the piezoelectrically-tunable cantilever beam material is selected from the group consisting of metals, metal alloys, dielectric materials, polymeric materials and combinations thereof.

19. The method as described in claim 15 wherein the piezoelectric means comprises a coating which is disposed as a layer between a first conductive coating and a second conductive coating, the conductive coatings being selected from the group consisting of conductive metals and conductive alloys of metals, and the first conductive coating and the second conductive coating being operably disposed so that the electrical potential means provides the electrical potential across the piezoelectric means therethrough.

20. The method as described in claim 15 further comprising the step of utilizing means for detecting vibration of the beam element.

21. The method as described in claim 20 wherein the detection means is selected from the group consisting of optical detection means, means utilizing changes in piezoresistance of the piezoelectric means and means utilizing changes in tunneling current between the piezoelectrically-tunable beam and a stationary electrode.

* * * * *